(12) United States Patent
Vick, Jr.

(10) Patent No.: US 11,041,363 B2
(45) Date of Patent: Jun. 22, 2021

(54) SAFETY VALVE WITH REVERSIBLE LOCKOUT

(71) Applicant: Halliburton Energy Services, Inc., Houston, TX (US)

(72) Inventor: James Dan Vick, Jr., Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 79 days.

(21) Appl. No.: 16/473,892

(22) PCT Filed: Jul. 30, 2018

(86) PCT No.: PCT/US2018/044407
§ 371 (c)(1),
(2) Date: Jun. 26, 2019

(87) PCT Pub. No.: WO2020/027780
PCT Pub. Date: Feb. 6, 2020

(65) Prior Publication Data
US 2020/0340330 A1    Oct. 29, 2020

(51) Int. Cl.
| E21B 34/10 | (2006.01) |
| E21B 34/14 | (2006.01) |
| F16K 1/20  | (2006.01) |

(52) U.S. Cl.
CPC .............. E21B 34/10 (2013.01); E21B 34/14 (2013.01); *E21B 2200/04* (2020.05);
(Continued)

(58) Field of Classification Search
CPC .. E21B 34/10; E21B 2200/04; E21B 2200/05; E21B 2200/06; F16K 1/2007
See application file for complete search history.

(56) References Cited

U.S. PATENT DOCUMENTS

| 3,066,693 | A | * | 12/1962 | Taylor, Jr. ............... E21B 21/10 |
| | | | | 137/454.2 |
| 3,981,358 | A | | 9/1976 | Watkins et al. |

(Continued)

OTHER PUBLICATIONS

ISRWO International Search Report and Written Opinion for PCT/US2018/044407 dated Apr. 23, 2019.
(Continued)

*Primary Examiner* — Giovanna Wright
*Assistant Examiner* — Dany E Akakpo
(74) *Attorney, Agent, or Firm* — Scott Richardson; C. Tumey Law Group PLLC

(57) ABSTRACT

Provided are systems and methods for decreasing the cost and improving a suitable well safety valve. A well safety valve, comprising: an outer housing having a central bore extending axially through the outer housing, wherein the outer housing comprises an outer wall having a receptacle formed in the outer wall; an inner sleeve disposed in the central bore of the outer housing, wherein the inner sleeve comprises a lockout feature in an exterior surface of the inner sleeve; a sleeve disposed in the receptacle; a piston disposed in the sleeve, wherein the piston is actuated to travel longitudinally in the sleeve, wherein the inner sleeve is operable to move in response to movement of the piston; and a valve member disposed in the outer housing, wherein the valve member is operable to selectively restrict flow through the well safety valve in response to movement of the inner sleeve.

20 Claims, 9 Drawing Sheets

(52) U.S. Cl.
 CPC ....... *E21B 2200/05* (2020.05); *E21B 2200/06* (2020.05); *F16K 1/2007* (2013.01)

(56) References Cited

U.S. PATENT DOCUMENTS

| | | |
|---|---|---|
| 4,161,219 A | 7/1979 | Pringle |
| 4,356,867 A | 11/1982 | Carmody |
| 4,624,315 A | 11/1986 | Dickson et al. |
| 5,249,630 A | 10/1993 | Meaders et al. |
| 10,472,929 B2 * | 11/2019 | Miller .................. E21B 23/006 |
| 2009/0056948 A1 | 3/2009 | Martin et al. |
| 2012/0205114 A1 | 8/2012 | Biddick et al. |
| 2016/0273304 A1 | 9/2016 | Vick, Jr. et al. |

OTHER PUBLICATIONS

Halliburton NE Tubing Retrievable Safety Valve datasheet dated 2017.

* cited by examiner

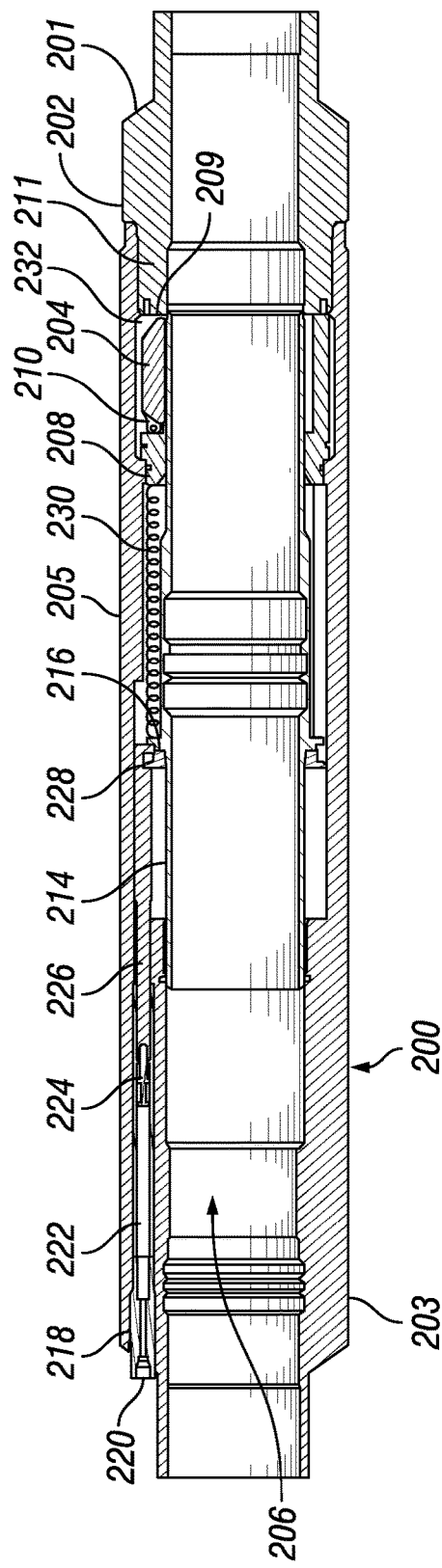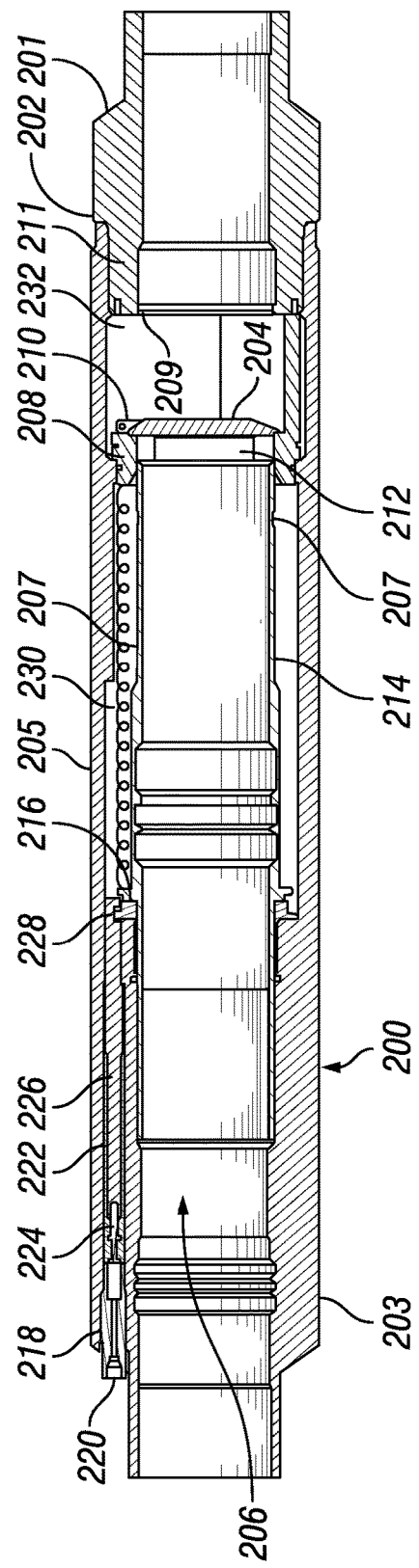

SAFETY VALVE WITH REVERSIBLE LOCKOUT

BACKGROUND

Well safety valves may be installed in a wellbore to prevent uncontrolled release of reservoir fluids. One type of well safety valve, commonly referred to as a tubing-retrieval safety valve (TRSV), may include a control line and a balance line. The control line may extend from the valve to the surface to pressurize the TRSV. The balance line may be used in offshore applications to balance the control line hydrostatic pressure negating the effect of hydrostatic pressure from the control line. The TRSV may be run downhole into a wellbore and retrieved after production has stopped.

Typically, TRSVs are manufactured from corrosive resistant material as the TRSVs may be exposed to various chemicals and fluids. Without regulatory requirements, the likelihood of installation of TRSVs in completed wellbores may be low due to the overall cost of the TRSV, as the TRSV has to be manufactured from a more expensive material in order to properly operate. Although the TRSV may be an important tool for preventative safety, customers may be wary to incur the high cost associated with its procurement and use. Additionally, a TRSV may be locked out to permanently ensure fluid communication from downhole to the surface. The typical lockout process may require additional runs downhole of separate tooling to actuate the TRSV, and it may not be beneficial to permanently set the TRSV in an open position.

BRIEF DESCRIPTION OF THE DRAWINGS

These drawings represent certain aspects of the present invention and should not be used to limit or define the disclosure.

FIG. 2 illustrates an example of a safety valve in an open position;

FIG. 3 illustrates an example of a safety valve in a closed position;

DETAILED DESCRIPTION

The present embodiments relate to subterranean operations and, more particularly, to well safety valves. Provided are systems and methods for decreasing the cost and improving the features of a TRSV or other suitable well safety valves. Disclosed herein are design features that may be beneficial over current available well safety valves, such as a sleeved receptacle for a piston, a constrained piston rod, a trapped flapper valve, a means for lockout and reversible lockout. In examples, a sleeved receptacle may reduce the amount of corrosive resistant material needed in the top sub-assembly of the well safety valve. A constrained piston rod may remove the need for a spring bearing and/or an alignment rod. A trapped flapper valve may allow for the internal components to be assembled as a singular assembly rather than multiple components. Further, a consolidated lockout and/or reversible lockout process may be provided with the incorporation of additional equipment.

Figure 1:
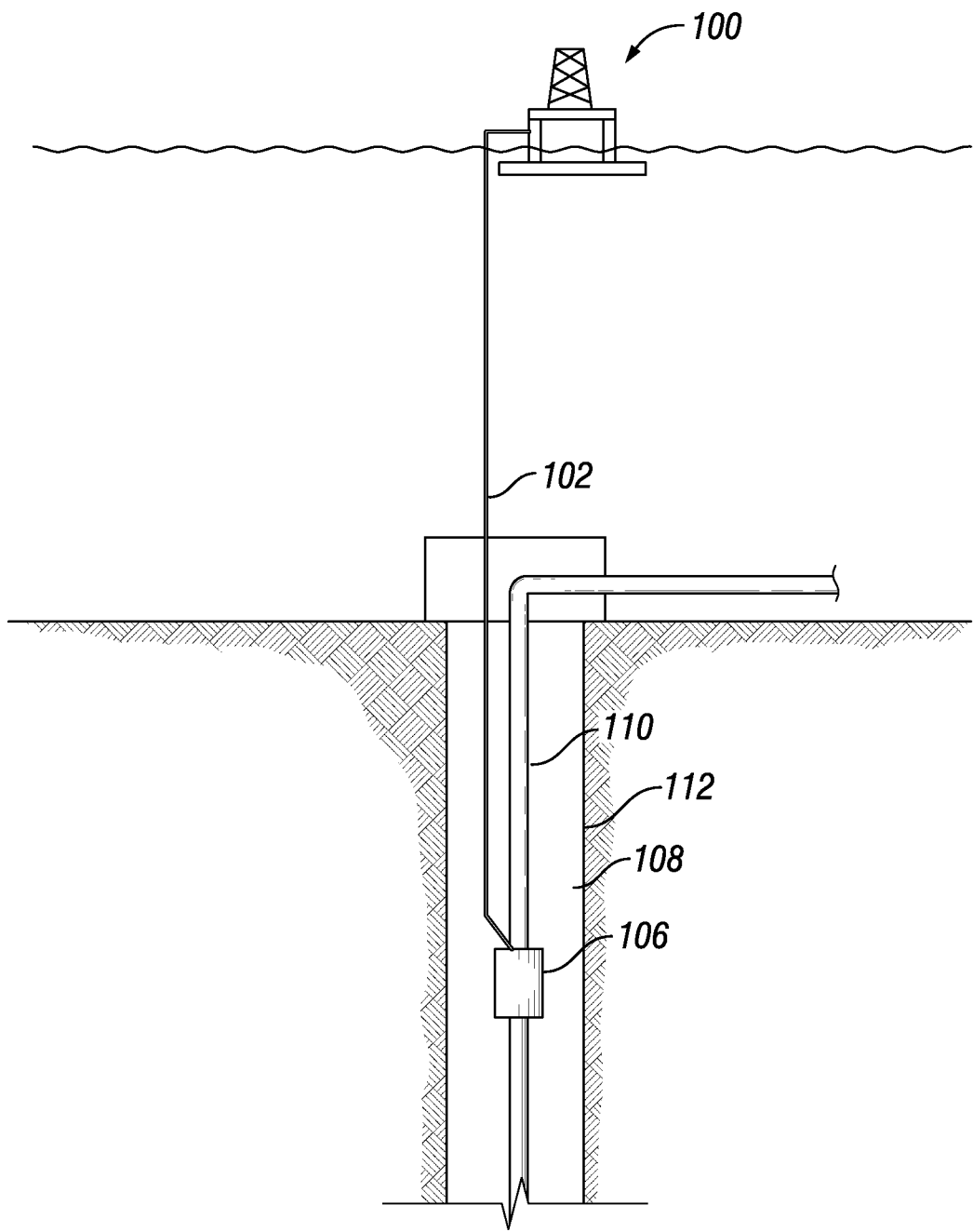
FIG. 1 illustrates an example of a tubing string with a safety valve.

FIG. 1 illustrates an offshore platform 100 connected to a safety valve 106 via control line 102. An annulus 108 may be defined between walls of well 112 and a conduit 110. Conduit 110 may be any conduit such as a casing, liner, production tubing, tubing string, or other tubulars disposed in a wellbore. In the following description of the safety valve 106 and other apparatus and methods described herein, directional terms, such as "above", "below", "upper", "lower", etc., are used only for convenience in referring to the accompanying drawings. Additionally, it is to be understood that the various examples of the present balance line safety valve described herein may be utilized in various orientations, such as inclined, inverted, horizontal, vertical, etc., and in various configurations, without departing from the principles of the present invention.

Safety valve 106 may be interconnected in conduit 110 and positioned in well 112. In examples, safety valve 106 may be disposed downhole to seal off conduit 110 from the flow of hydrocarbons. Although well 112, as depicted in FIG. 1, is an offshore well, one of ordinary skill should be able to adopt the teachings herein to any type of well including onshore or offshore. A control line 102 may extend into well 112 and may be connected to safety valve 106. Control line 102 may be used to actuate safety valve 106, for example, to maintain safety valve 106 in an open position and to close safety valve 106 to prevent a blowout in the event of an emergency.

In an example, control line 102 may be a hydraulic control line providing hydraulic fluid. Pressure may be applied to control line 102 at a remote location, such as a production platform or a subsea control station, to maintain safety valve 106 in an open position. In FIG. 1, pressure may be applied to control line 102 at offshore platform 100. To close safety valve 106, pressure in control line 102 may be reduced.

Although control line 102 is depicted in FIG. 1 as being external to conduit 110, it should be understood that control line 102 may be disposed at any suitable location to convey actuation pressure to safety valve 106. For example, control line 102 may be internal to conduit 110, or formed in a sidewall of conduit 110. Additionally, balance line 104 may be internal to conduit 110, or formed in a sidewall of conduit 110.

Figure 4:
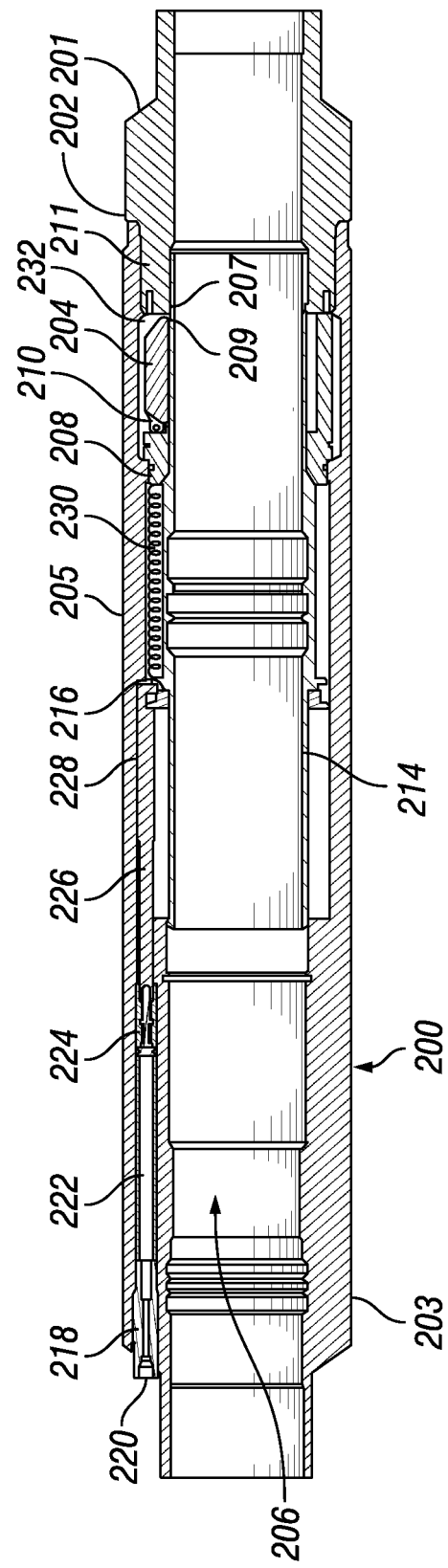
FIG. 4 illustrates an example of a safety valve in a lockout position.

Referring to FIGS. 2-4, an example of safety valve 106 is shown in various positions. FIG. 2 illustrates safety valve 106 in an open position. FIG. 3 illustrates safety valve 106 in a closed position. FIG. 4 illustrates safety valve 106 in a lockout position. Safety valve 106 may comprise a first sub assembly 200 and a second sub assembly 201. In examples, second sub assembly 201 may be conduit 110 (e.g., shown on FIG. 1) or may be an intermediate tubular connecting first sub assembly 200 to conduit 110. Second sub assembly 201 may comprise a plurality of rods (not illustrated). The plurality of rods may extend from second sub assembly 201 into first sub assembly 200 to secure certain tools and equipment (as discussed below).

First sub assembly 200 may comprise the internal components of safety valve 106 disposed within an outer housing 203 of first sub assembly 200. First sub assembly 200 may be affixed to an end 202 of second sub assembly 201, using any suitable mechanism, including, but not limited to, through the use of suitable fasteners, threading, adhesives, welding and/or any combination thereof. Without limitation, suitable fasteners may include nuts and bolts, washers, screws, pins, sockets, rods and studs, hinges and/or any combination thereof. First sub assembly 200 may comprise an outer housing 203. In examples, a central bore 206 may be formed through outer housing 203 that provides a flow path through first sub assembly 200.

In examples, a flapper valve 204 may be disposed into the central bore 206 of outer housing 203. Flapper valve 204 may selectively open and close central bore 206. In examples, central bore 206 may extend axially through first sub assembly 200. Although flapper valve 204 is depicted, note that any type of safety valve may be constructed to embody principles of the invention. Without limitation, flapper valve 204 may be another suitable valve member, such as a ball-type safety valve, or a sleeve-type safety valve, and others well known in the art. In examples, there may be a flapper assembly 208 that contains a hinge 210 that allows flapper valve 204 to rotate about a fixed point. Hinge 210 may be biased to force the flapper valve 204 to pivot to its open and/or closed position. Flapper assembly 208 may keep hinge 210 stationary in relation to first sub assembly 200. In examples, flapper assembly 208 may remain stationary by any suitable means. Flapper assembly 208 may further comprise a seat 212. Flapper valve 204 may rotate about hinge 210 to set against seat 212 to seal off central bore 206. Seat 212 may be any suitable size, height, and/or shape that accommodates flapper valve 204. Without limitation, a suitable shape may include, but is not limited to, cross-sectional shapes that are circular, elliptical, triangular, rectangular, square, hexagonal, and/or combinations thereof. Seat 212 may be made from any suitable material. Suitable materials may include, but are not limited to, metals, non-metals, polymers, ceramics, and/or combinations thereof. In examples, the plurality of rods of second sub assembly 201 may be disposed against seat 212 so as to prevent seat 212, and subsequently flapper assembly 208, from translating downwards.

An inner sleeve 214 may also be disposed in central bore 206 of outer housing 203. Inner sleeve 214 may align with the inner diameter of safety valve 106. Without limitations, inner sleeve 214 may be any suitable tubular. In examples, inner sleeve 214 may comprise a protrusion 216. Protrusion 216 may be a projection of material from inner sleeve 214 that projects into the inner bore of outer housing 203. Protrusion 216 may be any suitable size, height, and/or shape. Without limitation, a suitable shape may include, but is not limited to, a cross-sectional shape that is circular, elliptical, triangular, rectangular, square, hexagonal, and/or combinations thereof.

In examples, inner sleeve 214 may additionally comprise a notch 207, as best shown on FIG. 3. Notch 207 may be a dip, groove, and/or absence of material in the exterior surface of inner sleeve 214. Notch 207 may be any suitable size, height, and/or shape. Without limitation, a suitable shape may include, but is not limited to, cross-sectional shapes that are circular, elliptical, triangular, rectangular, square, hexagonal, and/or combinations thereof. In examples, notch 207 may accommodate a lockout feature (e.g., a protuberance 209) of an inner surface 211 of second sub assembly 201 during a lockout procedure, as will be discussed in further detail below.

As illustrated, a receptacle 222 may be formed in outer housing 203. In the illustrated embodiment, receptacle 222 may be formed in outer wall 205 of outer housing 203. To protect internal components of safety valve 106 from an external environment, receptacle 222 may be sleeved. As illustrated, a sleeve 218 may be disposed in receptacle 222 of outer housing 203. In examples, sleeve 21 may be disposed in receptacle 222 through the use of any suitable mechanism. Without limitation, any suitable mechanism may include, but is not limited to, the use of suitable fasteners, threading, adhesives, welding and/or any combination thereof. Without limitation, suitable fasteners may include nuts and bolts, washers, screws, pins, sockets, rods and studs, hinges and/or any combination thereof.

A control line port 220 may be provided for connecting control line 102 to safety valve 106. Control line port 220 may be formed in sleeve 218. When control line 102 (e.g., referring to FIG. 1) is connected to control line port 220, control line 102 may be placed in fluid communication with a piston 224. Although piston 224 is depicted with a single rod 226 in FIGS. 2-4, it should be understood that any type and any number of pistons may be used, such as multiple rod pistons, or an annular piston, etc. In examples, piston 224 may be sealed against other components with non-elastomer dynamic seals (not shown). A downhole end 228 of piston 224 may be disposed about protrusion 216, and a spring 230 may bias piston 224 upwardly.

A means of actuating spring 230 with piston 224 may be provided with protrusion 216. As piston 224, and subsequently rod 226, displaces downwards, rod 226 may push against protrusion 216. If the pressure supplied by control line 102 is greater than the upwardly biasing force of spring 230, protrusion 216 may displace downwards a given distance, thereby compressing spring 230. If the pressure supplied by control line 102 is less than the upwardly biasing force of spring 230, there may not be enough force to actuate protrusion 216 downwards to compress spring 230. If the pressure supplied by control line 102 is less than the upwardly biasing force of spring 230 while spring 230 is compressed, spring 230 may cause protrusion 216 to displace upwards, thereby displacing rod 226 upwards as well. As protrusion 216 is displaced, inner sleeve 214 may move in relation to the distance traveled by protrusion 216.

In examples, the operation of piston 224 may actuate flapper valve 204. As illustrated in FIGS. 2 and 4, flapper valve 204 may be disposed in a cavity 232 formed by outer housing 203 and inner sleeve 214. This may be designated as an open position for safety valve 106 as flapper valve 204 is not obstructing the potential flow of material through central bore 206, as illustrated in FIGS. 2 and 4. As inner sleeve 214 displaces upwards and downwards within safety valve 106, the size and/or shape of cavity 232 may change. In examples, a closed position of flapper valve 204 may be designated as when flapper valve 204 is perpendicular to central bore 206, as illustrated in FIG. 3, wherein flapper valve 204 prevents the flow of material through central bore 206. To actuate safety valve 106 from a closed position to an open position, pressure may be applied to piston 224 to move protrusion 216 and inner sleeve 214 downwards, thereby causing flapper valve 204 to return to cavity 232 to allow material to flow through central bore 206.

Figure 5:
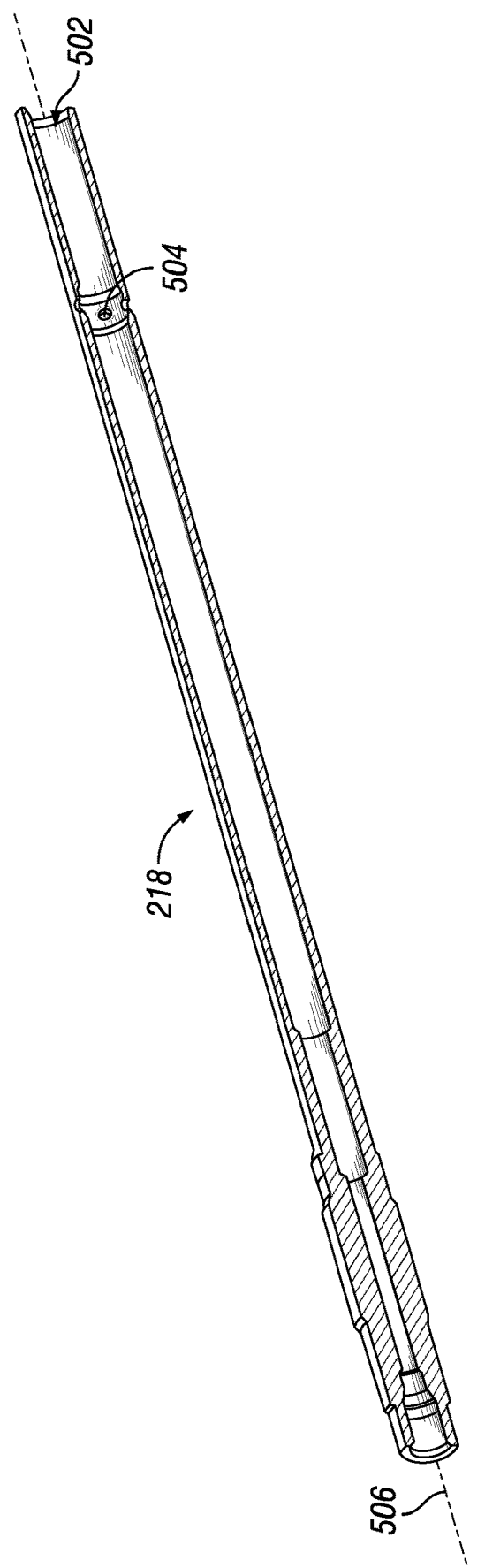
FIG. 5 illustrates an example of a sleeve.

FIG. 5 illustrates a cross-sectional view of a sleeve 218. Sleeve 218 may be any suitable size, height, and/or shape. Without limitation, a suitable shape may include, but is not limited to, cross-sectional shapes that are circular, elliptical, triangular, square, hexagonal, and/or combinations thereof. Sleeve 218 may be made from any suitable material that is resistant to corrosion. Suitable materials may include, but are not limited to, metals, nonmetals, polymers, ceramics, and/or combinations thereof. In examples, sleeve 218 may be made from 410 stainless steel (SS), Inconel 925, Inconel 718, Inconel 945x, and/or combinations thereof. In examples, outer housing 203 may be made of a less corrosion resistant material than sleeve 218. Without limitation, outer housing 203 may be made from 4130 steel, 410 SS, Inconel 925, Inconel 718, and/or combinations thereof.

Sleeve 218 may comprise a central bore 502 and a hole 504. Hole 504 may allow material to pass between the interior and exterior of sleeve 218. Central bore 502 may be an opening running the length of sleeve 218 disposed along a central axis 506. In examples, central bore 502 may accommodate the shapes of the equipment required to actuate piston 224 (e.g., referring to FIGS. 2-4).

Figure 6A:
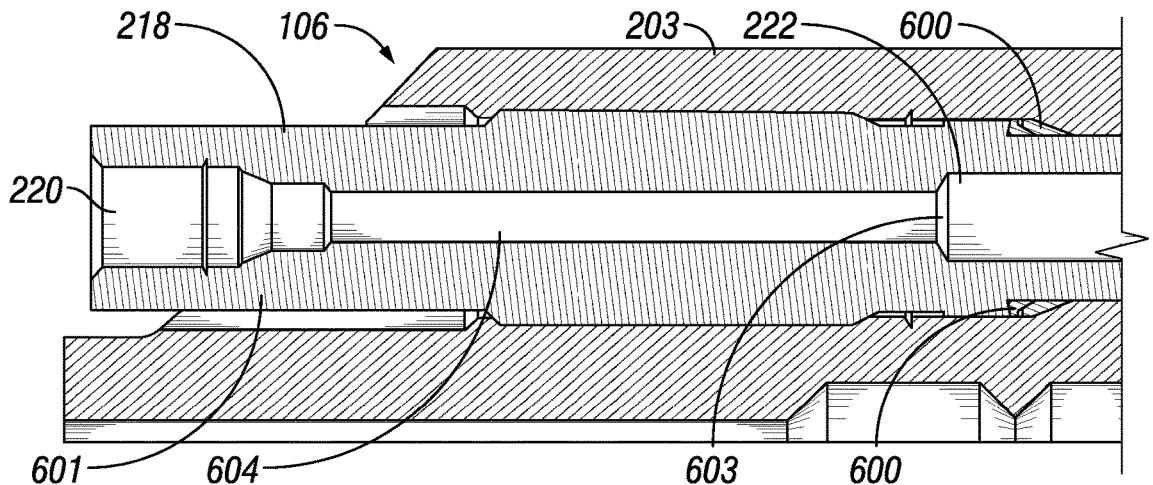
FIGS. 6A-C illustrate example configurations of a sleeve in a safety valve.
Figure 6B:
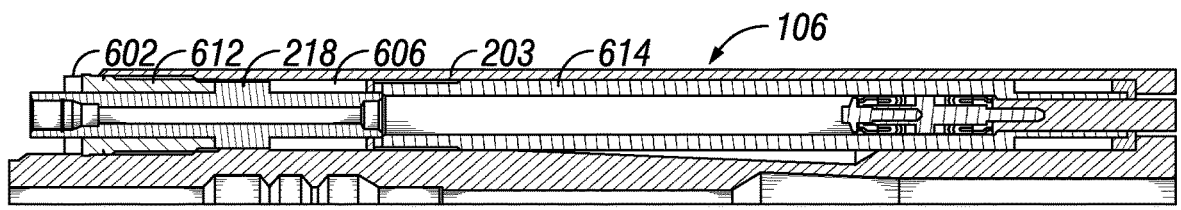
Figure 6C:
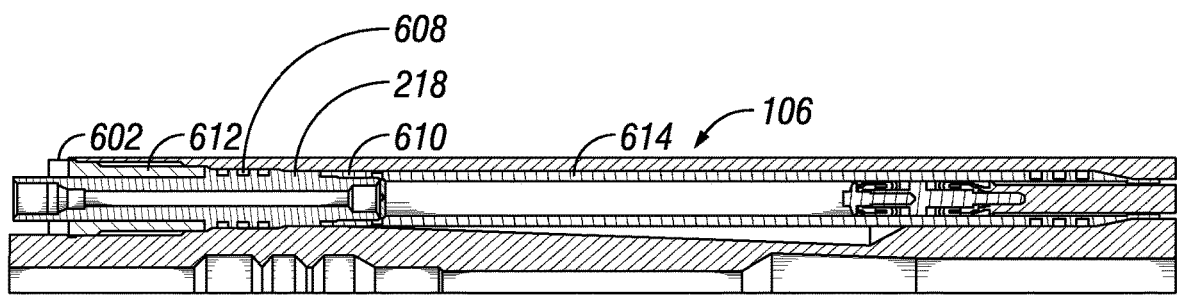

FIGS. 6A-6C illustrate various configurations of sleeve 218 within safety valve 106. As illustrated in FIG. 6A, sleeve 218 may be threaded into the inner bore of outer housing 203 to create a taper seal. A ferrule 600, or a plurality of ferrules 600, may be inserted into an annulus created between outer housing 203 and sleeve 218. Threading sleeve 218 into the annulus created between sleeve 218 and outer housing 203 may cause the plurality of ferrules 600 to flare.

Sleeve 218 may further comprise a flow tube 604. Flow tube 604 may be a tubular connecting control line port 220 to piston 224 within sleeve 218. Flow tube 604 may be any suitable size, height, and/or shape. Without limitation, a suitable shape may include, but is not limited to, cross-sectional shapes that are circular, elliptical, triangular, rectangular, square, hexagonal, and/or combinations thereof. Flow tube 604 may be positioned at end 601 of sleeve 218 and have a reduced diameter as compared to an extension portion 603 of sleeve 218 that extends from flow tube 604 towards piston 224. To further secure sleeve 218, a threaded nut 602 may be used to further secure sleeve 218 into outer housing 203, as best seen on FIGS. 6B and 6C.

In examples, a packing stack (not illustrated) may be used to seal sleeve 218 within safety valve 106. In examples, a packing stack may be an array of packers and/or other sealing elements. Without limitation, a packing stack may include MTM sealing V-rings. As illustrated on FIG. 6B, there may be an opening 606 wherein any suitable tool for sealing may be disposed. The tool for sealing may be actuated to radially expand to provide a seal between sleeve 218 and outer housing 203.

In other examples, O-rings (not illustrated) may be used to seal sleeve 218 within safety valve 106. As illustrated on FIG. 6C, there may be grooves 608 formed in an outer surface of sleeve 218 wherein the O-rings may be disposed. Further, a slip joint 610 may be present that presses on the sealing elements present to seal at least a portion of sleeve 218. As shown in FIGS. 6B and 6C, sleeve 218 may comprise a first section 612 and a second section 614. First section 612 and second section 614 may be two separate pieces of sleeve 218 that are sealed together. In examples, it may be beneficial to allow hydraulic fluid, provided by control line 102, to leak out between first section 612 and second section 614 into other components of safety valve 106 (i.e., central bore 206 shown on FIG. 2).

Figure 7A:
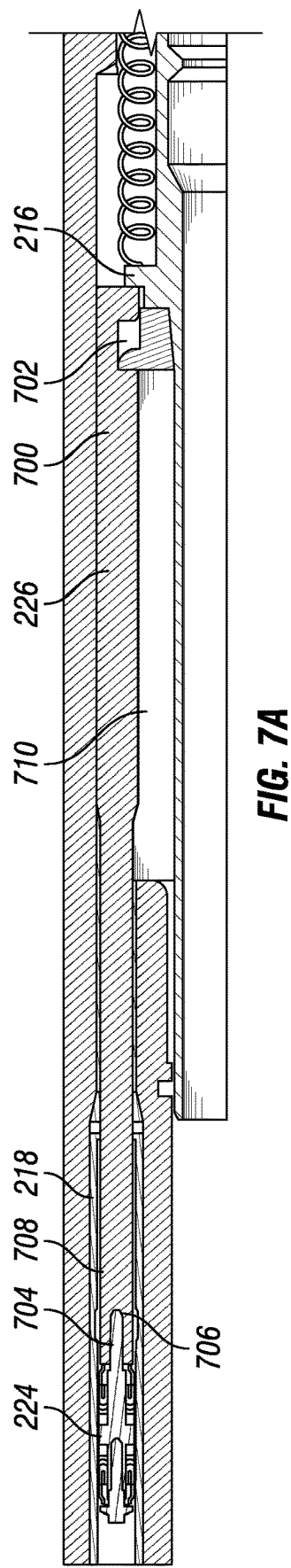
FIGS. 7A and B illustrate examples of a constrained piston rod.
Figure 7B:
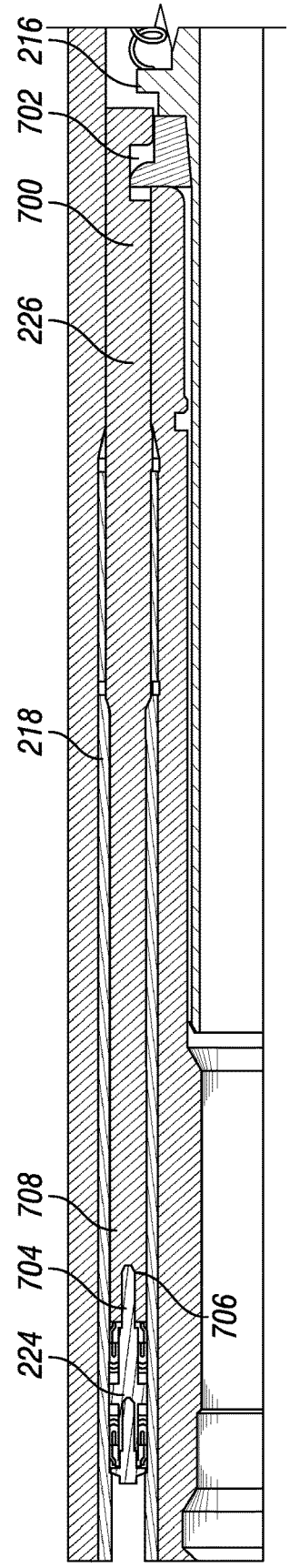

With reference to FIGS. 7A and 7B, views of piston 224 and rod 226 are depicted in an open and closed position, respectively. FIG. 7A illustrates an open position with rod 226 extended from sleeve 218. FIG. 7B illustrates a closed position, wherein rod 226 is retracted into a portion of sleeve 218. In examples, a portion of rod 226 may be contained within sleeve 218 while extended in the open position. Sleeve 218 may provide support to rod 226. Without limitations, at least 50%, 40%, 30%, 20% 10%, or 1% may be contained within sleeve 218 while in the open position. Traditionally, buckling of rod 226 may occur. To prevent buckling, rod 226 may be constrained laterally by having a larger outer diameter than the area in which rod 226 is disposed. Further, as illustrated, rod 226 may be constrained laterally, for example, as distal end 700 of rod 226 may be disposed in a pocket 702 formed at protrusion 216 from inner sleeve 214. As illustrated, the pocket 702 may be formed between protrusion 216 and outer housing 203. In examples, a portion of rod 226 may be secured to prevent twisting along a central axis of rod 226. For example, piston 224 may include a distal extension 704 that extends into a hole 706 formed at a proximal end 708 of rod 226. As illustrated, sleeve 218, piston 224, and/or rod 226 may not fully cover the inside of receptacle 222 (e.g., referring to FIGS. 2-4). There may be a half circle 710 of empty space present within receptacle 222. In examples, protrusion 216 may be displaced longitudinally along the length of half circle 710 when acted upon by rod 226.

Concerning the present disclosure, an alignment rod and/or a spring bearing may not be necessary for operation of safety valve 106 as rod 226 may be prevented from buckling and/or twisting. In examples, pistons 224 having a smaller size may be beneficial for use in safety valve 106 (e.g., referring to FIG. 1) as the size of a spring (not illustrated) could be reduced and/or the pressure supplied to close safety valve 106 could be increased. Further improvements from this design may include disposing flapper valve 204 (e.g., referring to FIGS. 2-4) further down along safety valve 106 in comparison to current TRSVs (e.g., an SP valve), reduced piston drag, longer life of piston 224 (e.g., referring to FIGS. 2-4), increased slam closure capability, and/or combinations thereof.

Figure 8A:
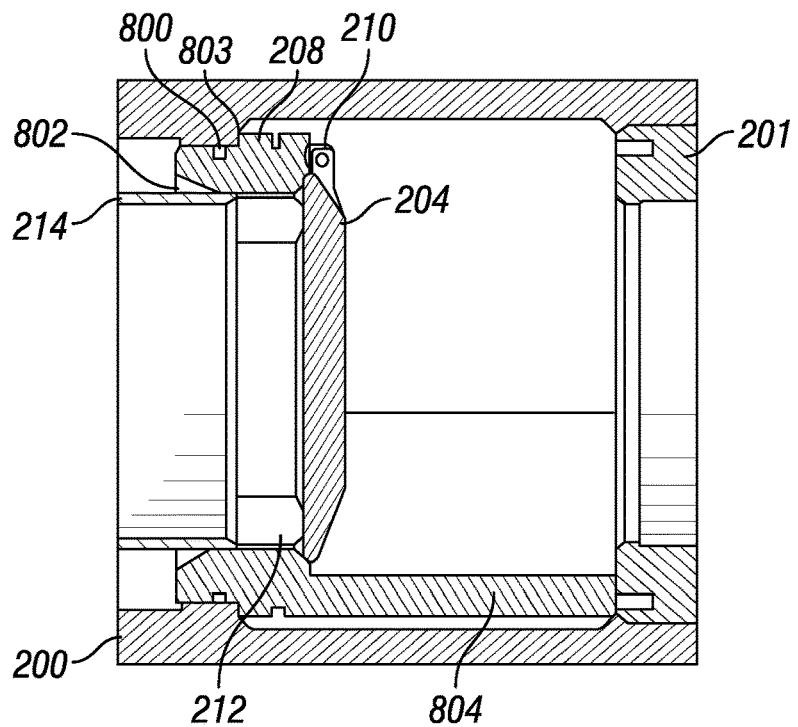
FIGS. 8A and B illustrate examples of a flapper valve and seat assembly.
Figure 8B:
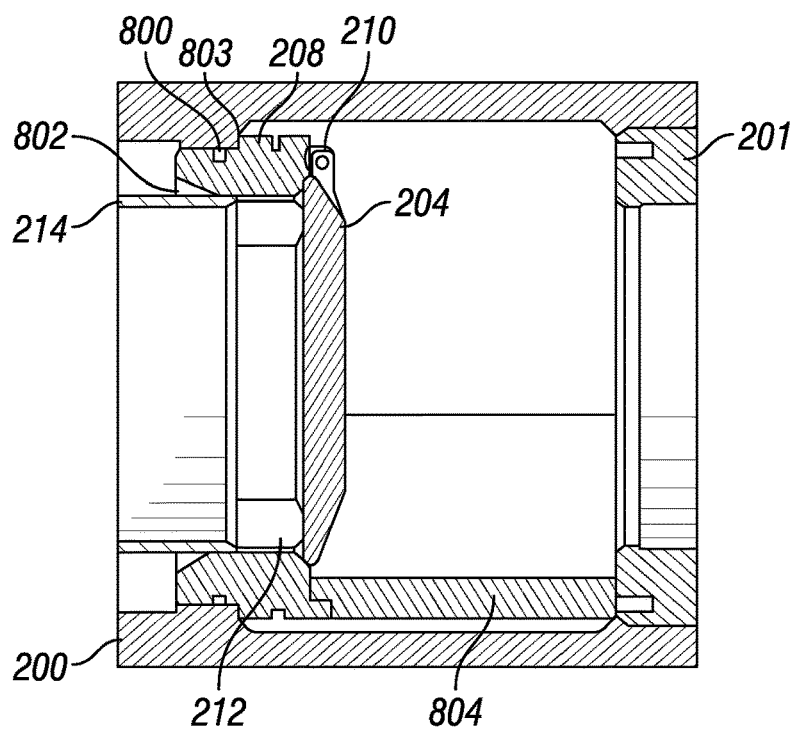

FIGS. 8A and 8B illustrate various examples of flapper valve 204 in a closed position. As illustrated in FIGS. 8A and 8B, there may be grooves 800 on flapper assembly 208 designated for O-rings (not illustrated). O-rings may seal off a lower portion of safety valve 106 (e.g., referring to FIG. 1) from an upper portion of safety valve 106. Flapper assembly 208 may keep hinge 210 stationary in relation to first sub assembly 200 (e.g., referring to FIG. 2) and inner sleeve 214. There may be an opening 802 to accommodate a portion of inner sleeve 214 (as discussed below). In examples, there may be a taper seal 803 which may be used in conjunction with O-rings to seal an upper portion of safety valve 106 from a lower portion of safety valve 106. Without limitations, taper seal 803 may have at least a 10% incline. In examples, a supporting rod 804 may be manufactured as a portion of seat 212 (as shown on FIG. 8A) and/or as a separate component (as shown on FIG. 8B). In FIG. 8A, supporting rod 804 may be unitary with seat 212. In FIG. 8B, supporting rod 804 may be separate from seat 212. Supporting rod 804 may provide structural support to seat 212 as gravity and/or pressure acts upon seat 212. For example, supporting rod 804 may engage second sub assembly 201 to hold seat 212 in place. Supporting rod 804 may be affixed to seat 212 using any suitable mechanism, including, but not limited to, through the use of suitable fasteners, threading, adhesives, welding and/or any combination thereof. Without limitation, suitable fasteners may include nuts and bolts, washers, screws, pins, sockets, rods and studs, hinges and/or any combination thereof. In examples, supporting rod 804 may be affixed to seat 212 as first sub assembly 200 is coupled to second sub assembly 201.

Figure 9:
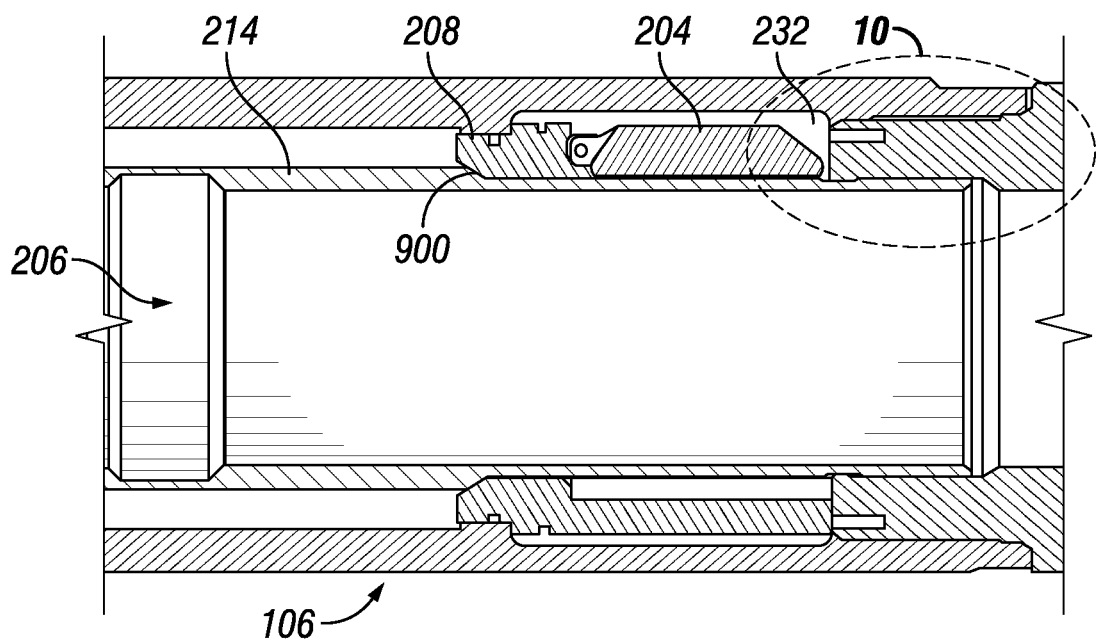
FIG. 9 illustrates an example close-up view of a safety valve in a lockout position.

FIG. 9 illustrates a close-up view of a portion of safety valve 106 in the lockout position. In examples, safety valve 106 may be in the open position wherein fluids (e.g., produced fluids) may flow through safety valve 106. Rather than continuously supplying pressure to piston 224 (e.g., referring to FIGS. 2-4) through control line 102 (e.g., referring to FIG. 1), an operator may lockout the safety valve 106 to keep flapper valve 204 disposed within cavity 232, thereby permanently allowing the flow of hydrocarbons through central bore 206. The lockout position may be wherein safety valve 106 cannot actuate internal components in an upwards and/or downwards fashion. Without limitation, an operator may be defined as an individual, group of individuals, or an organization. In examples, a latching tool (not illustrated) may be disposed about, around, and/or onto a profile tool (not illustrated), wherein the profile tool is attached to inner sleeve 214. In examples, the latching tool may be disposed about the inner diameter of safety valve 106 along central bore 206. The latching tool may be actuated to deliver a downwards force onto inner sleeve 214 in the same direction as the force applied. In examples, any suitable jarring equipment and/or tools may be used to actuate the latching tool downward. Without limitation, the jarring equipment and/or tools may be hydraulically and/or mechanically operated. For example, a slide hammer, a weight bar, and/or combinations thereof may be used. Additionally, an alternative method may use pressure instead of jarring action to displace the inner sleeve 214. For example, while not illustrated, a plug may be disposed above or below the latching tool to land in central bore 206. Pressure may then be applied to shift the inner sleeve 214. A dart mechanism (or other suitable device) may then be used during retrieval to allow the plug to be pulled out of the seal bore.

In examples, inner sleeve 214 may have a change in diameter designated as a ramp 900. Ramp 900 may be a portion of the length of inner sleeve 214 wherein the outer diameter of inner sleeve 214 is increasing or decreasing. As the latching tool jars piston 224, and subsequently inner sleeve 214, downwards, ramp 900 may enter into opening 802 (e.g., referring to FIGS. 8A-8B). Opening 802 may accommodate the shape of ramp 900. The displacement of ramp 900 into opening 802 may function as a shoulder for flapper assembly 208 as ramp 900 engages flapper assembly 208. As ramp 900 is disposed into opening 802, inner sleeve 214 may be prevented from further movement downwards.

Figure 10:
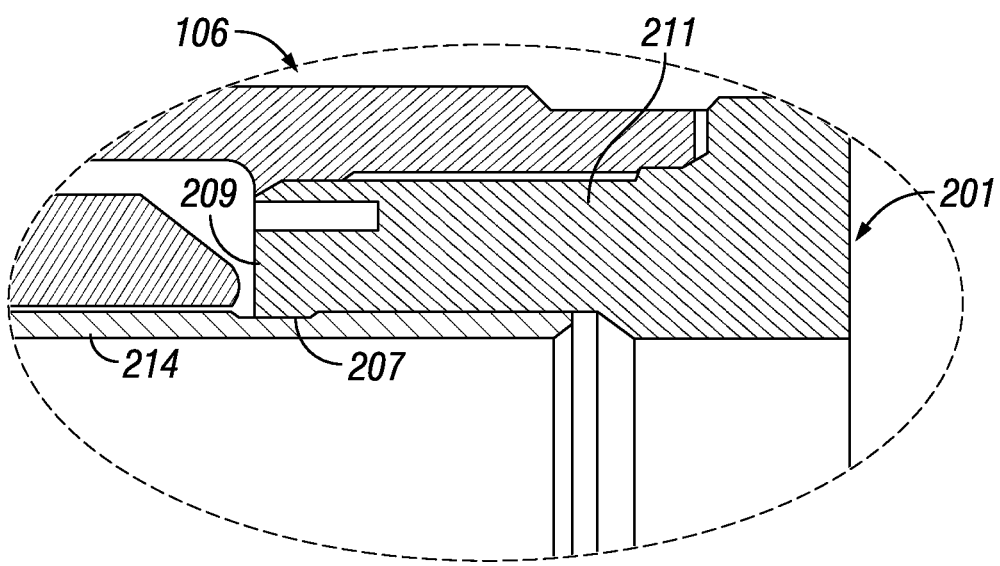
FIG. 10 illustrates an example close-up view of a notch in a safety valve.

With additional reference now to FIG. 10, another feature of locking out safety valve 106 may be depicted in more detail. FIG. 10 is a close-up view of FIG. 9 taken along circle 10. As the latching tool jars inner sleeve 214 downwards, inner sleeve 214 and, thus, notch 207 on exterior surface of inner sleeve 214 may be further displaced within safety valve 106. As ramp 900 disposes into opening 802 (best seen on FIG. 9), a lockout feature in the form of protuberance 209 of inner surface 211 of second sub assembly 201 may dispose into notch 207. Notch 207 may inhibit further movement of inner sleeve 214 as protuberance 209 physically abuts an inner portion of notch 207, thereby preventing any movement. While FIGS. 9 and 10 illustrate notch 207 on sleeve 214 and protuberance 209 on second sub assembly 201, this lockout feature may be otherwise formed, for example, with notch 207 on second sub assembly 201 with a corresponding lockout feature, such as protuberance 209 on sleeve 214.

Figure 11:
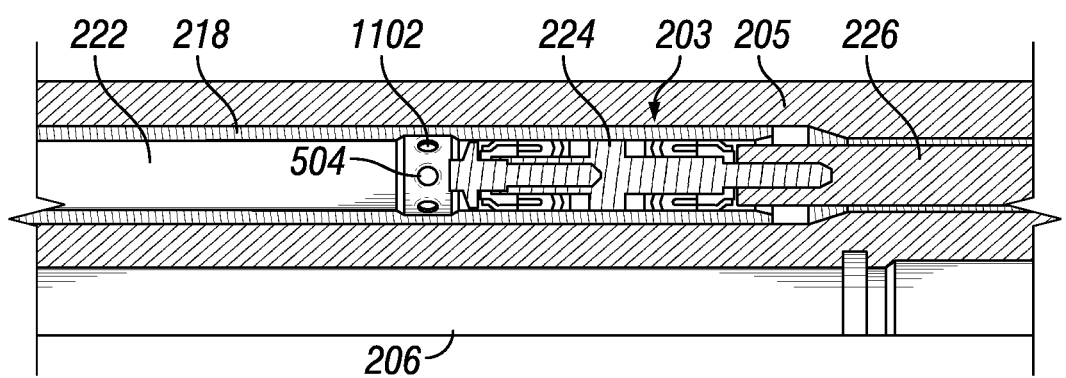
FIG. 11 illustrates an example piston in a by-pass position.

In the lockout position, piston 224 may be displaced through sleeve 218, as depicted in FIG. 11. Piston 224 may be displaced beyond one or more holes 504 formed in sleeve 218. As illustrated, one or more holes 504 in sleeve 218 may be aligned with one or more holes 1102 in outer housing 203. The one or more holes 1102 in outer housing 203 may provide fluid communication from sleeve 218 to central bore 206. In examples where piston 224 has not displaced past one or more holes 504, the one or more holes 504 may be blocked by piston 224 and/or rod 226. As piston 224 displaces through sleeve 218, the one or more holes 504 may be exposed to allow hydraulic fluid (or other fluid) provided by control line 102 (e.g., referring to FIG. 1) to through the interior of sleeve 218 and into central bore 206. In alternate examples, sleeve 218 may not comprise hole 504. Rather, a suitable hole may be made through sleeve 218 during the operation of safety valve 106. Safety valve 106 may further comprise a hole punch (not illustrated), or a separate tool may be run downhole to produce the hole through sleeve 218 and/or outer housing 203.

In certain examples, a second safety valve (not shown), or any suitable insert valve, may be disposed downhole on a wireline. The second safety valve may be disposed into the interior of and/or through the safety valve 106 that is incorporated into conduit 110 (e.g., referring to FIG. 1). As the hydraulic fluid from control line 102 (e.g., referring to FIG. 1) enters into the central bore 206 (e.g., referring to FIGS. 2-4), the hydraulic fluid may actuate the second safety valve. Alternatively, the second safety valve may be connected to a separate control line 102 for actuation.

In other examples, safety valve 106 may be designed with reverse angles that inhibit the process of actuating safety valve 106 out of the lockout position. Alternatively, a reversible lockout procedure may be enabled to actuate safety valve 106 into the original open position and/or the closed position. For example, the latching tool used to deliver a downwards force onto piston 224 may also be used to deliver an upwards force. In examples, the latching tool, when attached to the profile tool may jar piston 224 upwards. Inner sleeve 214 may additionally be displaced upwards, thereby removing ramp 900 (e.g., referring to FIG. 9) from opening 802 (e.g., referring to FIGS. 8A-8B) and/or removing protuberance 209 (e.g., referring to FIGS. 2-4) from notch 207 (e.g., referring to FIGS. 2-4). Inner sleeve 214 may be jarred upwards a suitable distance to reverse the process of the initial lockout. Without limitations, safety valve 106 may be actuated to and/or from the lockout position in order to clean out the control line 102 (e.g., referring to FIG. 1), purge the control line 102 of gas, pump methanol through control line 102 to washout any hydrates, and/or combinations thereof.

Accordingly, this disclosure describes systems, methods, and apparatuses that may relate to the improvement of safety valves. The systems, methods, and apparatus may further be characterized by one or more of the following statements.

Statement 1. A well safety valve, comprising: an outer housing having a central bore extending axially through the outer housing, wherein the outer housing comprises an outer wall having a receptacle formed in the outer wall; an inner sleeve disposed in the central bore of the outer housing, wherein the inner sleeve comprises a lockout feature in an exterior surface of the inner sleeve; a sleeve disposed in the receptacle; a piston disposed in the sleeve, wherein the piston is actuated to travel longitudinally in the sleeve, wherein the inner sleeve is operable to move in response to movement of the piston; and a valve member disposed in the outer housing, wherein the valve member is operable to selectively restrict flow through the well safety valve in response to movement of the inner sleeve.

Statement 2. The well safety valve of statement 1, wherein the valve member comprises a flapper valve.

Statement 3. The well safety valve of statement 1 or 2, further comprising a rod, wherein the rod is disposed at an end of the piston.

Statement 4. The well safety valve of statement 3, wherein the inner sleeve comprises a protrusion and a ramp, wherein the protrusion is disposed in a path of motion of the rod.

Statement 5. The well safety valve of statement 4, wherein the valve member further comprises a flapper assembly, wherein the flapper assembly comprises a hinge and an opening, wherein the opening accommodates the ramp of the inner sleeve.

Statement 6. The well safety valve of statement 3, wherein rod has a larger outer diameter than the piston, and wherein a distal end of the rod is contained in a pocket that restricts rotation of the rod.

Statement 7. The well safety valve of any of the preceding statements, wherein a first sub assembly comprises the outer housing, the inner sleeve, the sleeve, the piston, and the valve member, wherein a second sub assembly is threaded into the outer housing.

Statement 8. The well safety valve of statement 7, wherein the lockout feature comprises a notch in the exterior surface of the inner sleeve, wherein the notch in the inner sleeve receives a corresponding lockout feature on an inner surface of the second sub assembly.

Statement 9. The well safety valve of statement 7, wherein the valve member comprises a flapper assembly comprising a hinge and a seat, wherein the valve member further comprise a flapper valve rotatable about the hinge to set again the seat to seal flow through the well safety valve.

Statement 10. The well safety valve of statement 9, wherein the flapper assembly comprises grooves and seals received in the grooves for forming a seal against the outer housing.

Statement 11. The well safety valve of statement 9, wherein the valve member further comprises a supporting rod that engages the second sub assembly to hold valve member in the outer housing.

Statement 12. The well safety valve of statement 11, wherein the supporting rod is unitary with the flapper assembly, or wherein the supporting rod is a separate component from the supporting rod.

Statement 13. The well safety valve of any of the preceding statements, wherein one or more holes are formed in the sleeve to provide communication with the central bore through the outer housing, wherein one or more holes in the outer wall align with one or more holes in the sleeve.

Statement 14. The well safety valve of any of the preceding statements, further comprising a threaded nut that secures the sleeve in the receptacle, wherein one or more ferrules are disposed in an annulus between the sleeve and the outer wall of the outer housing to form a seal.

Statement 15. A method of locking out a safety valve in an open position, comprising: displacing an inner sleeve of the safety valve to move toward a distal end of the safety valve, wherein the inner sleeve engages a valve member to hold the valve member in the open position, wherein the valve member is disposed in an outer housing of a first sub assembly, and wherein the inner sleeve is displaced in a central bore of the outer housing; and further displacing the inner sleeve such that a lockout feature on an outer surface of the inner sleeve engages a corresponding lockout feature on an inner surface of a second sub assembly to restrict backwards movement of the inner sleeve thus locking out the safety valve in the open position, wherein the second sub assembly is coupled to the first sub assembly.

Statement 16. The method of statement 15, wherein a ramp of the inner sleeve forms a shoulder with the valve member to inhibit further movement of the inner sleeve toward the distal end.

Statement 17. The method of statement 15 or 16, further comprising displacing the inner sleeve away from the distal end to disengage the lockout feature of inner sleeve from the second sub assembly.

Statement 18. The method of any one of statements 15 to 17, wherein the lockout feature on the outer surface of the inner sleeve comprise a notch on the outer surface, and wherein the corresponding lockout feature on the inner surface of the second sub assembly comprise a protuberance on the inner surface.

Statement 19. The method of any one of statements 15 to 18, wherein the further displacing comprises applying a downward force onto the inner sleeve.

Statement 20. The method of any one of statements 15 to 19, wherein the outer housing comprises a receptacle in an outer wall of the outer housing, wherein a sleeve is disposed in the receptacle and a piston is disposed in the sleeve, wherein one or more holes in the sleeve are aligned with one or more holes in the outer housing that provide fluid communication from the receptacle to the central bore of the outer housing, wherein when the safety valve is locked out, the piston is displaced in the sleeve beyond one or more holes in the sleeve such that fluid communication is established between the receptacle and the central bore, wherein the method further comprises flowing fluid from a control line, through the sleeve, and into the central bore.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A well safety valve comprising:
   an outer housing having a central bore extending axially through the outer housing, wherein the outer housing comprises an outer wall having a receptacle formed in the outer wall;
   an inner sleeve disposed in the central bore of the outer housing, wherein the inner sleeve comprises a lockout feature in an exterior surface of the inner sleeve;
   a second sleeve disposed in the receptacle;
   a piston disposed in the second sleeve, wherein the piston is actuated to travel longitudinally in the second sleeve, wherein the inner sleeve is operable to move in response to movement of the piston;
   a valve member disposed in the outer housing, wherein the valve member is operable to selectively restrict flow through the well safety valve in response to movement of the inner sleeve; and
   a rod that is disposed at an end of the piston, wherein the inner sleeve comprises a protrusion and a ramp, wherein the protrusion is disposed in a path of motion of the rod.

2. The well safety valve of claim 1, wherein the valve member comprises a flapper valve.

3. The well safety valve of claim 1, wherein the valve member further comprises a flapper assembly.

4. The well safety valve of claim 3, wherein the flapper assembly comprises a hinge and an opening.

5. The well safety valve of claim 4, wherein the opening accommodates the ramp of the inner sleeve.

6. The well safety valve of claim 3, wherein the rod has a larger outer diameter than the piston, and wherein a distal end of the rod is contained in a pocket that restricts rotation of the rod.

7. The well safety valve of claim 1, wherein a first sub assembly comprises the outer housing.

8. The well safety valve of claim 7, wherein the valve member comprises a flapper assembly comprising a hinge and a seat, wherein the valve member further comprises a flapper valve rotatable about the hinge to seat against the seat to seal flow through the well safety valve.

9. The well safety valve of claim 8, wherein the flapper assembly comprises grooves and seals received in the grooves for forming a seal against the outer housing.

10. A well safety valve comprising:
    an outer housing having a central bore extending axially through the outer housing, wherein the outer housing comprises an outer wall having a receptacle formed in the outer wall;
    an inner sleeve disposed in the central bore of the outer housing, wherein the inner sleeve comprises a lockout feature in an exterior surface of the inner sleeve;
    a second sleeve disposed in the receptacle;
    a piston disposed in the second sleeve, wherein the piston is actuated to travel longitudinally in the second sleeve, wherein the inner sleeve is operable to move in response to movement of the piston;
    a valve member disposed in the outer housing, wherein the valve member is operable to selectively restrict flow through the well safety valve in response to movement of the inner sleeve;
    wherein a first sub assembly comprises the outer housing, the inner sleeve, the second sleeve, the piston, and the valve member, wherein a second sub assembly is threaded into the outer housing; and
    wherein the lockout feature comprises a notch in the exterior surface of the inner sleeve, wherein the notch in the inner sleeve receives a corresponding lockout feature on an inner surface of the second sub assembly.

11. A well safety valve comprising:
    an outer housing having a central bore extending axially through the outer housing, wherein the outer housing comprises an outer wall having a receptacle formed in the outer wall;
    an inner sleeve disposed in the central bore of the outer housing, wherein the inner sleeve comprises a lockout feature in an exterior surface of the inner sleeve;
    a second sleeve disposed in the receptacle;
    a piston disposed in the second sleeve, wherein the piston is actuated to travel longitudinally in the second sleeve, wherein the inner sleeve is operable to move in response to movement of the piston;
    a valve member disposed in the outer housing, wherein the valve member is operable to selectively restrict flow through the well safety valve in response to movement of the inner sleeve;
    wherein a first sub assembly comprises the outer housing, the inner sleeve, the second sleeve, the piston, and the valve member, wherein a second sub assembly is threaded into the outer housing;
    wherein the valve member comprises a flapper assembly comprising a hinge and a seat;
    wherein the valve member further comprises a flapper valve rotatable about the hinge to seat against the seat to seal flow through the well safety valve; and
    wherein the valve member further comprises a supporting rod that engages the second sub assembly to hold the valve member in the outer housing.

12. The well safety valve of claim 11, wherein the supporting rod is unitary with the flapper assembly, or wherein the supporting rod is a separate component from the flapper assembly.

13. A well safety valve comprising:
    an outer housing having a central bore extending axially through the outer housing, wherein the outer housing comprises an outer wall having a receptacle formed in the outer wall;
    an inner sleeve disposed in the central bore of the outer housing, wherein the inner sleeve comprises a lockout feature in an exterior surface of the inner sleeve;

a second sleeve disposed in the receptacle;
a piston disposed in the second sleeve, wherein the piston is actuated to travel longitudinally in the second sleeve, wherein the inner sleeve is operable to move in response to movement of the piston;
a valve member disposed in the outer housing, wherein the valve member is operable to selectively restrict flow through the well safety valve in response to movement of the inner sleeve;
wherein one or more holes are formed in the second sleeve to provide communication with the central bore through the outer housing, wherein one or more holes in the outer wall align with the one or more holes in the second sleeve.

14. A well safety valve comprising:
an outer housing having a central bore extending axially through the outer housing, wherein the outer housing comprises an outer wall having a receptacle formed in the outer wall;
an inner sleeve disposed in the central bore of the outer housing, wherein the inner sleeve comprises a lockout feature in an exterior surface of the inner sleeve;
a second sleeve disposed in the receptacle;
a piston disposed in the second sleeve, wherein the piston is actuated to travel longitudinally in the second sleeve, wherein the inner sleeve is operable to move in response to movement of the piston;
a valve member disposed in the outer housing, wherein the valve member is operable to selectively restrict flow through the well safety valve in response to movement of the inner sleeve; and
a threaded nut that secures the second sleeve in the receptacle, wherein one or more ferrules are disposed in an annulus between the second sleeve and the outer wall of the outer housing to form a seal.

15. A method of locking out a safety valve in an open position, comprising:
displacing an inner sleeve of the safety valve to move toward a distal end of the safety valve, wherein the inner sleeve engages a valve member to hold the valve member in the open position, wherein the valve member is disposed in an outer housing of a first sub assembly, and wherein the inner sleeve is displaced in a central bore of the outer housing; and
further displacing the inner sleeve such that a lockout feature on an outer surface of the inner sleeve engages a corresponding lockout feature on an inner surface of a second sub assembly to restrict backwards movement of the inner sleeve thus locking out the safety valve in the open position, wherein the second sub assembly is coupled to the first sub assembly.

16. The method of claim 15, wherein a ramp of the inner sleeve forms a shoulder with the valve member to inhibit further movement of the inner sleeve toward the distal end.

17. The method of claim 15, further comprising displacing the inner sleeve away from the distal end to disengage the lockout feature of inner sleeve from the second sub assembly.

18. The method of claim 15, wherein the lockout feature on the outer surface of the inner sleeve comprise a notch on the outer surface, and wherein the corresponding lockout feature on the inner surface of the second sub assembly comprise a protuberance on the inner surface.

19. The method of claim 15, wherein the further displacing comprises applying a downward force onto the inner sleeve.

20. The method of claim 15, wherein the outer housing comprises a receptacle in an outer wall of the outer housing, wherein a second sleeve is disposed in the receptacle and a piston is disposed in the second sleeve, wherein one or more holes in the second sleeve are aligned with one or more holes in the outer housing that provide fluid communication from the receptacle to the central bore of the outer housing, wherein when the safety valve is locked out, the piston is displaced in the second sleeve beyond one or more holes in the second sleeve such that fluid communication is established between the receptacle and the central bore, wherein the method further comprises flowing fluid from a control line, through the second sleeve, and into the central bore.

* * * * *